(12) United States Patent
Ko et al.

(10) Patent No.: US 9,639,405 B2
(45) Date of Patent: May 2, 2017

(54) SYSTEM AND METHOD FOR PROVIDING SETTLEMENT INFORMATION

(71) Applicant: SAMSUNG ELECTRONICS CO., LTD., Suwon-si (KR)

(72) Inventors: Jae-woo Ko, Uiwang-si (KR); Tae-hwan Wi, Suwon-si (KR)

(73) Assignee: SAMSUNG ELECTRONICS CO., LTD., Suwong-Si (KR)

( * ) Notice: Subject to any disclaimer, the term of this patent is extended or adjusted under 35 U.S.C. 154(b) by 29 days.

(21) Appl. No.: 14/010,045

(22) Filed: Aug. 26, 2013

(65) Prior Publication Data

US 2014/0059565 A1 Feb. 27, 2014

(30) Foreign Application Priority Data

Aug. 24, 2012 (KR) .................. 10-2012-0093292

(51) Int. Cl.
| | |
|---|---|
| *G06F 9/54* | (2006.01) |
| *G06Q 30/04* | (2012.01) |
| *G06Q 30/06* | (2012.01) |
| *G06Q 30/02* | (2012.01) |

(52) U.S. Cl.
CPC ......... *G06F 9/541* (2013.01); *G06Q 30/0238* (2013.01); *G06Q 30/04* (2013.01); *G06Q 30/0641* (2013.01)

(58) Field of Classification Search
None
See application file for complete search history.

(56) References Cited

U.S. PATENT DOCUMENTS

| 6,775,359 | B1 * | 8/2004 | Ron et al. .................. 379/88.14 |
| 2005/0182617 | A1 | 8/2005 | Reynar et al. |
| 2006/0271634 | A1 * | 11/2006 | England et al. .............. 709/206 |
| 2008/0168072 | A1 * | 7/2008 | Freedman ......... G06F 17/30581 |
| 2009/0068990 | A1 | 3/2009 | Kim et al. |
| 2010/0082445 | A1 | 4/2010 | Hodge et al. |
| 2010/0125873 | A1 | 5/2010 | Yano et al. |

(Continued)

FOREIGN PATENT DOCUMENTS

| CN | 1838162 A | 9/2006 |
| CN | 102129607 A | 7/2011 |

(Continued)

OTHER PUBLICATIONS

Communication dated Apr. 3, 2014 issued by the European Patent Office in counterpart European Patent Application No. 13181581.3.

(Continued)

*Primary Examiner* — Tuan Dao
(74) *Attorney, Agent, or Firm* — Sughrue Mion, PLLC

(57) ABSTRACT

A method for providing settlement information in which a device provides settlement information to an application which is installed on the device includes executing a first application which is installed on the device, receiving settlement information from an external device via the executed first application, converting at least a part of the received settlement information, and providing the converted settlement information to a second application which is installed on the device in order to allow the second application to use the received settlement information.

19 Claims, 9 Drawing Sheets

(56) References Cited

U.S. PATENT DOCUMENTS

| | | | |
|---|---|---|---|
| 2011/0140841 A1* | 6/2011 | Bona | G06K 19/06187 340/5.83 |
| 2011/0191160 A1* | 8/2011 | Blackhurst et al. | 705/14.38 |
| 2011/0202864 A1* | 8/2011 | Hirsch | G06F 3/0482 715/773 |
| 2012/0131645 A1* | 5/2012 | Harm | G06F 21/6218 726/4 |
| 2013/0144706 A1* | 6/2013 | Qawami et al. | 705/14.27 |
| 2015/0172393 A1* | 6/2015 | Oplinger | H04L 67/18 709/204 |

FOREIGN PATENT DOCUMENTS

| | | |
|---|---|---|
| CN | 101833817 B | 8/2014 |
| KR | 10-2005-0106597 A | 11/2005 |
| KR | 10-2006-0026497 A | 3/2006 |
| KR | 10-0682719 B1 | 2/2007 |
| KR | 10-0782734 B1 | 12/2007 |
| KR | 10-2011-0042549 A | 4/2011 |

OTHER PUBLICATIONS

International Search Report dated Dec. 16, 2013, issued by the International Searching Authority in counterpart International Application No. PCT/KR2013/007583.

Written Opinion dated Dec. 16, 2013, issued by the International Searching Authority in counterpart International Application No. PCT/KR2013/007583.

Communication issued Feb. 6, 2017, issued by the State Intellectual Property office of the People's Republic of China in counterpart Chinese Patent Application No. 201380044507.0.

* cited by examiner

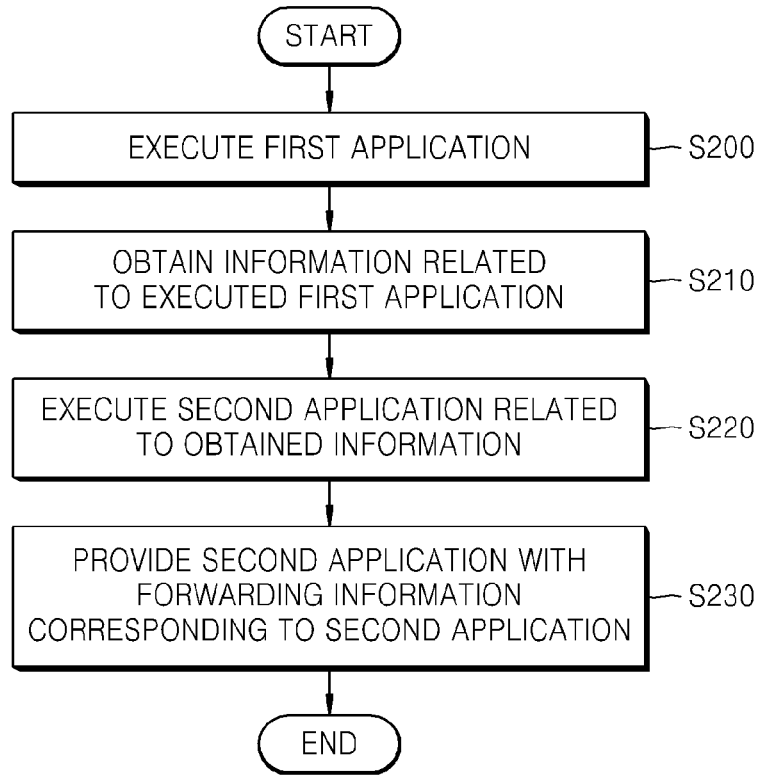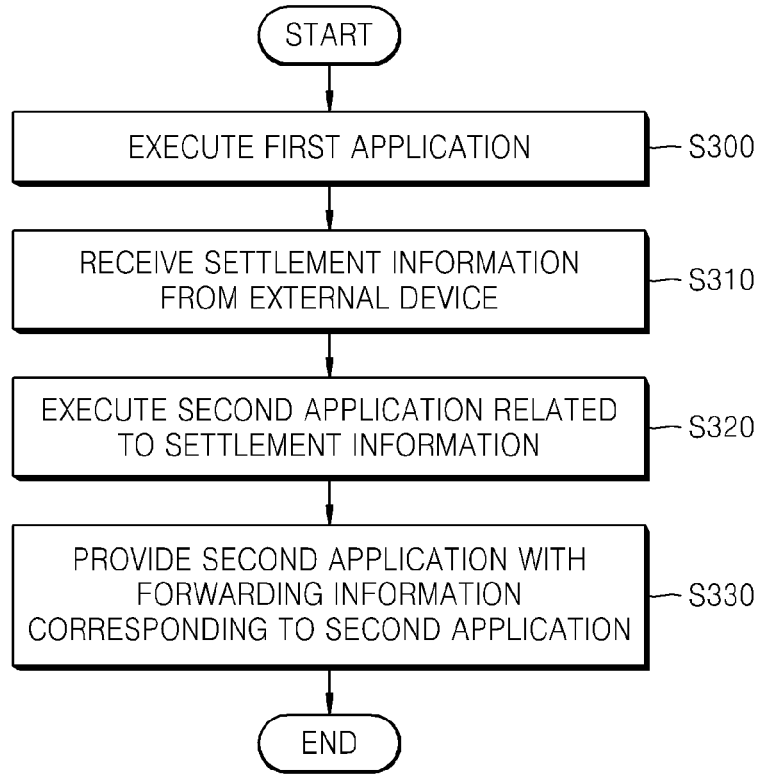

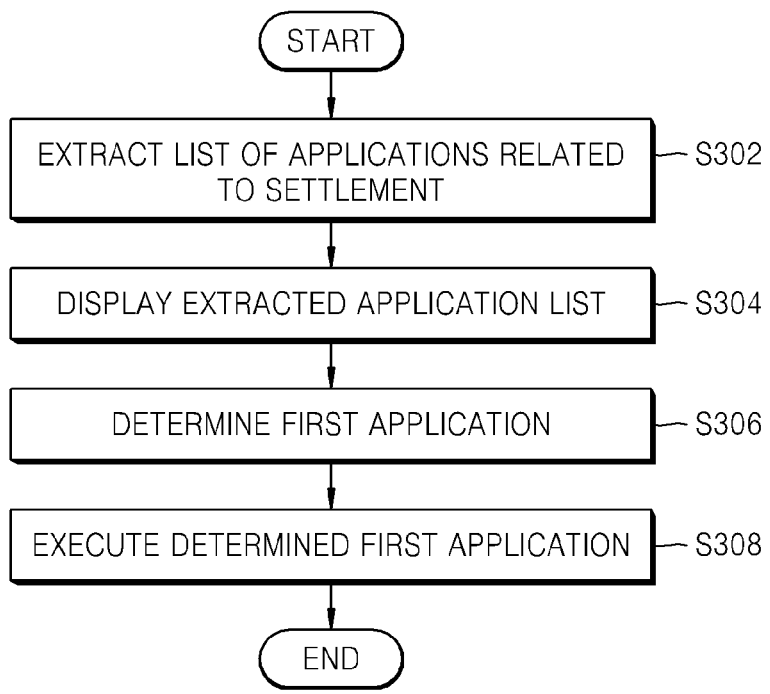
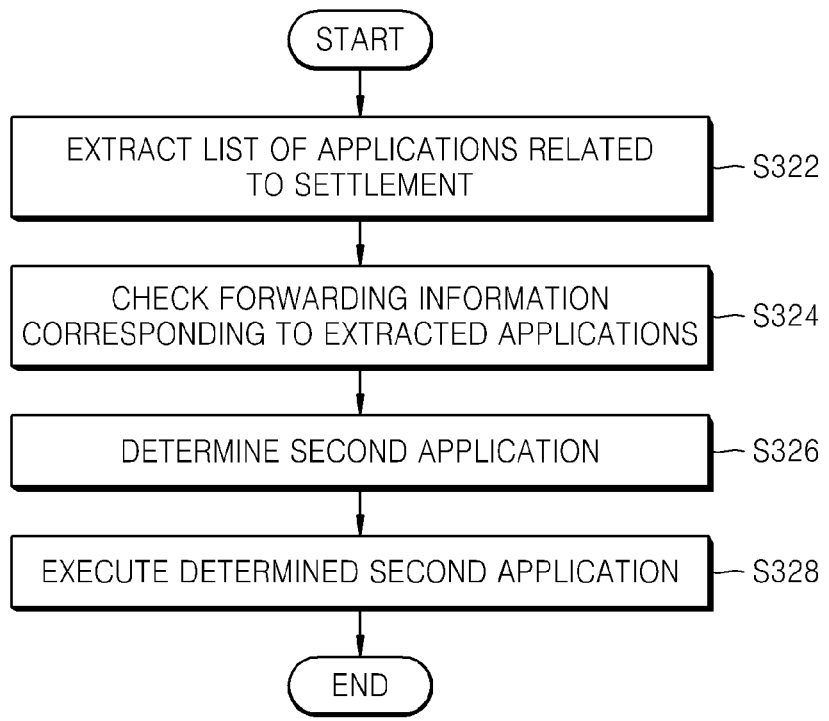

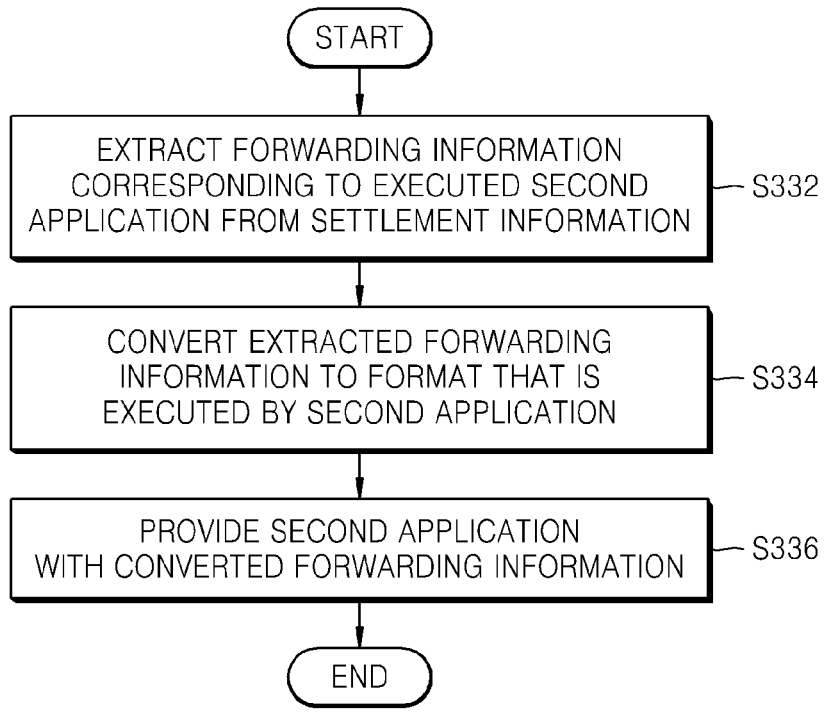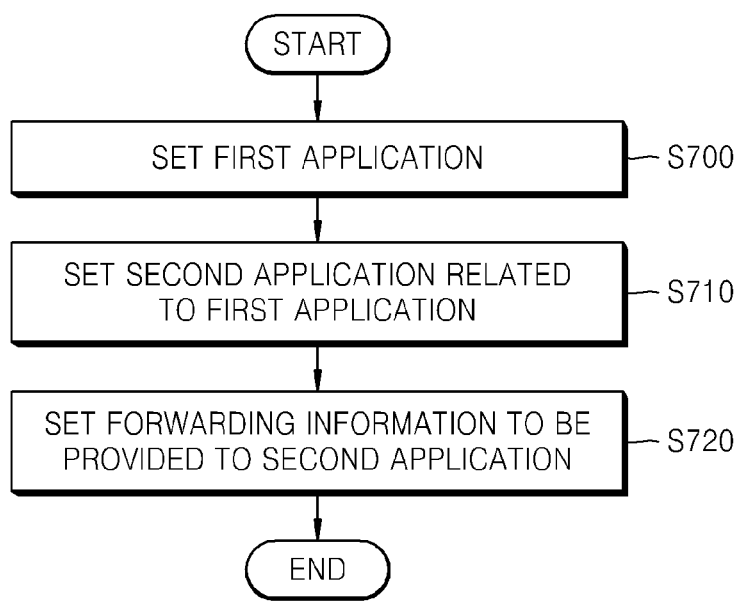

FIG. 8

| FIRST APPLICATION (80) | SECOND APPLICATION (82) | FORWARDING INFORMATION (84) | DATA TYPE (86) |
|---|---|---|---|
| MOBILE WALLET | BUDGET PLANNER | PURCHASED GOODS<br>SETTLEMENT AMOUNT<br>PURCHASED DATE<br>PURCHASED TIME<br>SELLER INFORMATION | IMAGE<br>TEXT |
| MOBILE WALLET | CALENDAR | PURCHASED GOODS<br>RESERVATION INFORMATION | IMAGE<br>TEXT |
| MOBILE WALLET | SNS | PURCHASED GOODS<br>PURCHASED DATE<br>PURCHASED TIME<br>RESERVATION INFORMATION | MOVING PICTURE<br>IMAGE<br>TEXT<br>VOICE |
| CALENDAR | SNS | SCHEDULE INFORMATION | MOVING PICTURE<br>IMAGE<br>TEXT<br>VOICE |
| ⋮ | ⋮ | ⋮ | ⋮ |

# SYSTEM AND METHOD FOR PROVIDING SETTLEMENT INFORMATION

CROSS-REFERENCE TO RELATED PATENT APPLICATIONS

This application claims priority from Korean Patent Application No. 10-2012-0093292, filed on Aug. 24, 2012, in the Korean Intellectual Property Office, the disclosure of which is incorporated herein by reference in its entirety.

BACKGROUND

1. Field

Exemplary embodiments relate to a system and method for providing settlement information, and more particularly, to a system and method for providing settlement information to an application which is installed on a device.

2. Description of the Related Art

With recent developments in multimedia technology and communication technology, various kinds of devices, such as personal computers (PCs), personal digital assistants (PDAs), smartphones, portable multimedia players (PMPs), MP3 players, etc., have been distributed. A variety of kinds of applications are installed on these devices. Various applications which are installed on a device may share various pieces of information in the device. However, the number of applications which are installed on a device gradually increases, and thus, a user needs to effectively use information which may be obtained from a predetermined application via other applications.

SUMMARY

Exemplary embodiments provide a system and method for providing settlement information by using a device which may provide settlement information which is received from an external device via a predetermined application which is installed on the device to another application which is installed on the device.

According to an aspect of one or more exemplary embodiments, a method for providing settlement information by using a device which provides the settlement information to an application which is installed on the device includes executing a first application which is installed on the device, receiving the settlement information from an external device via the executed first application, converting at least a part of the received settlement information, and providing the converted at least the part of the received settlement information to a second application which is installed on the device in order to facilitate a use of the received settlement information by the second application.

The converting at least the part of the received settlement information may include extracting forwarding information to be provided to the second application from the at least the part of the received settlement information and converting a format of the extracted forwarding information.

The converting at least the part of the received settlement information may further include using a server to convert the format of the extracted forwarding information, and the providing the converted at least the part of the received settlement information to the second application may include providing the extracted forwarding information to the server and using the server to provide the extracted forwarding information for which the format has been converted by the server to the second application.

The method may further include determining the second application which relates to the received settlement information, wherein the providing the converted at least the part of the received settlement information to the second application may include providing forwarding information which corresponds to the determined second application to the second application.

The forwarding information which corresponds to the second application may include information which is selected from the received settlement information.

When the settlement information is received, a user interface which is usable for determining the second application may be provided, and the forwarding information which corresponds to the second application may be output.

The user interface may include a popup window.

The first application may include an application which relates to making a settlement, and the second application may include at least one of a calendar application, a budget planner application, and a social network service (SNS) application.

According to another aspect of one or more exemplary embodiments, a device for providing settlement information to an application which is installed on the device includes an application execution component which is configured to execute a first application which is installed on the device, an information acquisition component which is configured to receive settlement information from an external device via the executed first application, a forwarding information conversion component which is configured to convert at least a part of the received settlement information in order to facilitate a use of the received settlement information by a second application which is installed on the device, and an information providing component which is configured to provide the converted at least the part of the received settlement information to the second application.

The forwarding information conversion component may be further configured to extract forwarding information to be provided to the second application from the received settlement information and to cause a conversion of a format of the extracted forwarding information.

The forwarding information conversion component may be further configured to provide the extracted forwarding information to a server and to receive, from the server, the forwarding information for which the format has been converted by the server.

The device may further include an application determination component which is configured to determine the second application which relates to the received settlement information, wherein the information providing component is further configured to provide forwarding information which corresponds to the determined second application to the second application.

The forwarding information which corresponds to the second application may include information which is selected from the received settlement information.

When the settlement information is received, a user interface which is usable for determining the second application may be provided, and the forwarding information which corresponds to the second application may be output.

The user interface may include a popup window.

The first application may include an application which relates to making a settlement, and the second application may include at least one of a calendar application, a budget planner application, and a social network service (SNS) application.

According to another aspect of one or more exemplary embodiments, a method for providing data by using a device which provides data to an application which is installed on the device includes executing a first application which is installed on the device, receiving data from an external device via the executed first application, converting at least a part of the received data, and providing the converted at least the part of the received data to a second application which is installed on the device in order to facilitate a use of the received data by the second application.

According to another aspect of one or more exemplary embodiments, there is provided a non-transitory computer-readable recording medium having recorded thereon a program for executing the above-defined settlement information providing method.

According to another aspect of one or more exemplary embodiments, there is provided a non-transitory computer-readable recording medium having recorded thereon a program for executing the above-defined data providing method.

BRIEF DESCRIPTION OF THE DRAWINGS

The above and other features and advantages of the present inventive concept will become more apparent by describing in detail exemplary embodiments thereof with reference to the attached drawings in which:

FIG. 2 is a flowchart which illustrates a method by which a device provides information which is received from an external device to a predetermined application, according to an exemplary embodiment;

FIG. 3 is flowchart which illustrates a method by which a device provides information which is received from a point-of-sale (POS) terminal to a predetermined application, according to an exemplary embodiment;

FIG. 4 is a flowchart which illustrates a method by which a device executes a first application, according to an exemplary embodiment;

FIG. 5 is a flowchart which illustrates a method by which a device executes a second application, according to an exemplary embodiment;

FIG. 6 is a flowchart which illustrates a method by which a device converts forwarding information and provides the converted forwarding information to the second application, according to an exemplary embodiment;

FIG. 7 is a flowchart which illustrates a method for setting the first application, the forwarding information, and the second application, according to an exemplary embodiment;

FIG. 8 is an example of a forwarding information table which shows the second application and the forwarding information and a data type which correspond to the second application, according to an exemplary embodiment;

DETAILED DESCRIPTION

Figure 1:
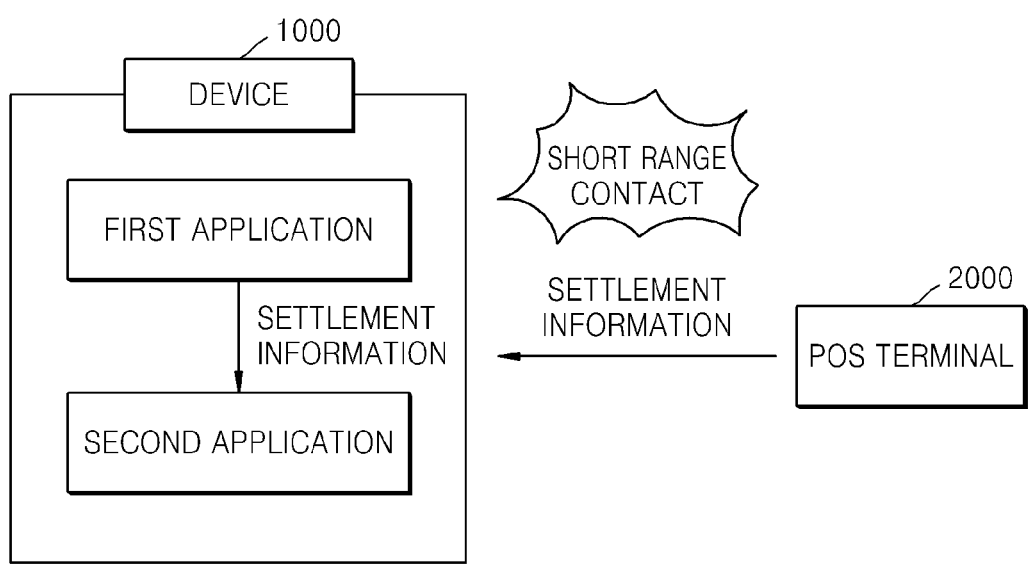
FIG. 1 is a block diagram which schematically illustrates an overall concept of a settlement information providing system, according to an exemplary embodiment.

The attached drawings for illustrating exemplary embodiments are referred to in order to gain a sufficient understanding of the exemplary embodiments, the merits thereof, and the objectives accomplished by the implementation of the exemplary embodiments. Hereinafter, the present inventive concept will be described in detail by explaining exemplary embodiments with reference to the attached drawings. Like reference numerals in the drawings denote like elements.

Expressions such as "at least one of," when preceding a list of elements, modify the entire list of elements and do not modify the individual elements of the list.

In the present disclosure, when a constituent element "connects" or is "connected" to another constituent element, the constituent element contacts or is connected to the other constituent element not only "directly", but also "electrically" with other constituent element(s) therebetween. When a part may "include" a particular constituent element, unless specified otherwise, it may not be construed to exclude another constituent element but may be construed to further include other constituent elements.

FIG. 1 is a block diagram which schematically illustrates an overall concept of a settlement information providing system, according to an exemplary embodiment. Referring to FIG. 1, the settlement information providing system according to the present exemplary embodiment may include a device 1000 and a point of sale (POS) terminal 2000. The device 1000 may receive settlement information from the POS terminal 2000 as the device 1000 approaches within a predetermined range from the POS terminal 2000. The settlement information includes information which relates to a settlement of goods or service and may include, for example, any one or more of the name of goods, the name of a service, a settlement date, a settlement time, seller information, service provider information, and reservation information. Also, the reservation information may include information which relates to, for example, a reservation for watching a performance, such as a movie or play. The device 1000 may execute a first application and may receive settlement information from the POS terminal 2000 via the executed first application. In this case, the first application may include, for example, an application for making a settlement, such as a mobile wallet, but the exemplary embodiments are not limited thereto. Alternatively, the device 1000 may execute the first application when the settlement information is received from the POS terminal 2000.

The device 1000 may provide a part of or the whole of the settlement information which is received from the POS terminal 2000 to a second application which is installed on the device 1000. When providing the settlement information, the device 1000 may determine the second application based on a predetermined standard. The second application may include at least one of an application which matches the first application and an application which relates to the received settlement information. The device 1000 may execute the determined second application and may provide forwarding information to the executed second application. In this case, the forwarding information may include information which is selected from the received settlement information, and the type of information which is included in the forwarding information may be set in advance. The device 1000 may convert a format of the forwarding information to a format that is usable by the second application, and may provide the converted forwarding information to the second application.

Although FIG. 1 illustrates that the device 1000 receives settlement information from the POS terminal 2000, the present exemplary embodiment is not limited thereto. Alternatively, the device 1000 may receive settlement information from a separate server (not shown). The device 1000 may generate, or obtain from the separate server, various pieces of information other than the settlement information and may provide the generated and/or obtained information to the second application. The various pieces of information other than the settlement information may include, for example, any one or more of position information, time information, path information, traffic information, user context information, etc., but the present exemplary embodiment is not limited thereto. The device 1000 may include any one or more of smartphones, mobile phones, personal digital assistants (PDAs), laptop computers, media players, global positioning system (GPS) devices, and other mobile or fixed computing devices, but the present exemplary embodiment is not limited thereto.

FIG. 2 is a flowchart which illustrates a method by which the device 1000 provides information which is received from an external device to a predetermined application, according to an exemplary embodiment. In FIG. 2, the device 1000 may collect various kinds of information via the first application and may provide collected information to the second application.

In operation S200, the device 1000 executes the first application. The first application in operation S200 may include at least one of a plurality of predetermined applications which are installed on the device 1000.

In operation S210, the device 1000 obtains information which relates to the executed first application. For example, if the first application is an application which relates to executing a settlement, the device 1000 may obtain settlement information which relates to the settlement via the first application. Also, for example, if the first application is a navigation application, the device 1000 may obtain any one or more of position information, path information, and traffic information.

In operation S220, the device 1000 executes the second application. The device 1000 may preset the second application based on the obtained information. For example, if the obtained information includes settlement information, the second application which relates to the settlement information may include at least one of a budget planner application, a social network service (SNS) application, and a calendar application. Also, for example, if the obtained information includes position information, the second application which relates to the position information may include at least one of a map application, a subway information providing application, and a bus information providing application.

Although in operation S220 the second application matches the obtained information, the present exemplary embodiment is not limited thereto. Alternatively, the second application may match the first application that is being executed. In this case, the second application which matches the first application may be set in advance.

In operation S230, the device 1000 provides the second application with forwarding information which corresponds to the second application. The forwarding information includes information that is usable in the second application from among the obtained information, and may be selected from the obtained information. For example, when the information which is obtained by the device 1000 via the first application includes the name of goods, the name of a service, a settlement date, a settlement time, seller information, service provider information, reservation information, position information, and path information, the forwarding information which matches the second application may include the name of goods, the name of a service, and the reservation information. The second application may perform an operation of the second application by using the received forwarding information as an input value.

The device 1000 may convert the format of the forwarding information to a format that is usable by the second application and may provide forwarding information for which the format has been converted to the second application. In this case, the device 1000 may collect in advance information which relates to a data format which is supported by the second application from the second application or the separate server. The information which relates to the data format that is usable by the second application may include, for example, codec information and/or a file extension name, but the present exemplary embodiment is not limited thereto.

The device 1000 may change the type of data. For example, the device 1000 may convert voice data to text data, or vice versa. In this case, various types of text-to-speech (TTS) technologies and speech-to-text (STT) technologies are usable for the conversion of the type of data. For example, the device 1000 may capture a part of moving picture data in order to convert the captured data to still image data, but the present exemplary embodiment is not limited thereto.

The device 1000 may provide forwarding information to the separate server and may receive forwarding information which has been converted by the separate server. The converted forwarding information has a format which is compatible with the second application. In this case, the device 1000 may provide the separate server with the forwarding information, an identification value of the second application, and information which relates to the data format that is usable by the second application, and may provide a request to the separate server to convert the forwarding information. The separate server that converts the format of forwarding information may include, for example, any one or more of an SNS server, a settlement service providing server, a content providing server, and a shopping service providing server, but the present exemplary embodiment is not limited thereto.

FIG. 3 is flowchart which illustrates a method by which the device 1000 provides information received from the POS terminal 2000 to a predetermined application, according to an exemplary embodiment. In FIG. 3, the first application is an application which relates to executing a settlement, and may receive settlement information from the POS terminal 2000.

In operation S300, the device 1000 executes the first application. The device 1000 may determine a predetermined application from among the applications which are installed on the device 1000 as the first application and may execute the determined first application. In this case, the device 1000 may select, as the first application, a predetermined application from among applications that make settlements. The device 1000 may display, on a screen, a list of applications that make settlements, and may select a predetermined application based on a user selection input. For example, the device 1000 may execute a mobile wallet application.

In operation S310, the device 1000 receives settlement information from an external device. In operation S310, the device 1000 which is approaching the POS terminal 2000 may receive settlement information from the POS terminal 2000, but the present exemplary embodiment is not limited thereto. The device 1000 may receive settlement information from the separate server. The settlement information may include, for example, any one or more of the name of goods, the name of a service, a settlement date, a settlement time, seller information, service provider information, and reservation information.

Although FIG. 3 illustrates that the device 1000 executes the first application and receives settlement information from an external device, the present exemplary embodiment is not limited thereto. Alternatively, the device 1000 may execute the first application after receiving the settlement information from an external device.

In operation S320, the device 1000 executes the second application which relates to the settlement information. The device 1000 may select at least one of a plurality of applications which relate to the settlement information as the second application and may execute the selected second application. The device 1000 may set in advance as the second application an application that uses a part of or the whole of the received settlement information. For example, the second application may include at least one of a budget planner application, an SNS application, and a calendar application that use the settlement information.

The second application may be determined based on a user input. The device 1000 may display on the screen a list of applications which relate to the settlement information and may determine as the second application a predetermined application based on a received user input with respect to the application list.

The device 1000 may match the first application and predetermined applications, and may determine at least one of the matched applications as the second application. In this case, the device 1000 may select applications which correspond to the first application based on the received user input, may display the selected application list on the screen, and may determine the second application based on the received user input with respect to the displayed application list.

In operation S330, the device 1000 provides the second application with forwarding information which corresponds to the second application. In operation S330, the device 1000 may extract forwarding information which corresponds to the second application from the settlement information and may provide the second application with the extracted forwarding information. The device 1000 may automatically provide the second application with the extracted forwarding information, but the present exemplary embodiment is not limited thereto. The device 1000 may display on the screen a separate user interface and may provide the second application with forwarding information in response to a user's transmission request that is received via the displayed user interface.

The type of forwarding information which corresponds to the second application may be set in advance. For example, if the second application is a budget planner application, forwarding information which corresponds to the budget planner application may include information which may be used for keeping a budget planner from among the settlement information. For example, the forwarding information which corresponds to the budget planner application may include information which relates to at least one of purchased goods, a settlement amount, a purchase date, a purchase time, and a seller.

For example, if the second application is a calendar application, forwarding information which corresponds to the calendar application may include information which relates to a schedule recorded on a calendar. For example, the forwarding information which corresponds to the calendar application may include at least one of purchased goods information and reservation information.

For example, if the second application is an SNS application, forwarding information which corresponds to the SNS application may include information which relates to communication between users. For example, the forwarding information which corresponds to the SNS application may include at least one of purchased goods information, purchase date information, purchase time information, and reservation information.

In operation S330, the device 1000 may convert extracted forwarding information to a format that is usable by the second application and may provide the converted forwarding information to the second application.

FIG. 4 is a flowchart which illustrates a method by which the device 1000 executes the first application, according to an exemplary embodiment. Referring to FIG. 4, applications which relate to settlement may be extracted, and the first application may be determined from among the extracted applications.

In operation S302, the device 1000 extracts applications which relate to settlement. In operation S302, the device 1000 may extract applications which relate to making settlements from among the applications which are installed on the device 1000.

In operation S304, the device 1000 displays a list of the extracted applications. The extracted application list may be displayed on the screen of the device 1000 via a separate popup window. In this case, the extracted applications may be displayed on the screen by being aligned based on a frequency of use.

In operation S306, the device 1000 determines the first application. The device 1000 may select the first application based on a user selection input with respect to the application list. In operation S308, the device 1000 executes the determined first application.

FIG. 5 is a flowchart which illustrates a method by which the device 1000 executes the second application, according to an exemplary embodiment.

In operation S322, the device 1000 extracts applications which relate to settlement. In operation S322, the device 1000 may extract applications that may use settlement information. For example, the device 1000 may extract one or more of a budget planner application, a calendar application, and an SNS application.

In operation S324, the device 1000 determines forwarding information which corresponds to the extracted applications. The device 1000 may determine respective forwarding information which matches the extracted applications from among information which is included in the received settlement information. In this case, the forwarding information which matches the extracted applications may be set in advance. For example, if the second application is a budget planner application, forwarding information which corresponds to the budget planner application may include information which relates to at least one of purchased goods, a settlement amount, a purchase date, a purchase time, and a seller. Also, for example, if the second application is a calendar application, forwarding information which corresponds to the calendar application may include at least one of purchased goods information and reservation information. Also, if the second application is an SNS application, forwarding information which corresponds to the SNS application may include at least one of purchased goods information, purchase date information, purchase time information, and reservation information.

In operation S326, the device 1000 determines the second application. The device 1000 may display the extracted application list on the screen and may determine the second application based on a user selection input with respect to the application list. In this case, the device 1000 may recommend some of the extracted applications based on the type of forwarding information included in the settlement information and may align the recommended applications based on a respective frequency of use. For example, if the settlement information includes purchased goods information, purchased data information, and settlement amount information, a budget planner application and an SNS application that use the purchased goods information, the purchased data information, and the settlement amount information may be recommended. Also, for example, if the settlement information includes reservation information, the device 1000 may recommend a calendar application. The application list may be displayed on the screen of the device 1000 via a separate popup window.

In operation S328, the device 1000 executes the determined second application. The device 1000 may execute the determined second application and may provide the second application with forwarding information which corresponds to the second application. In this case, the forwarding information may be converted to a format that is usable by the second application, and the converted forwarding information may include an input value with respect to the second application.

FIG. 6 is a flowchart which illustrates a method by which the device 1000 converts forwarding information and provides converted forwarding information to the second application, according to an exemplary embodiment.

In operation S332, the device 1000 extracts forwarding information which corresponds to the executed second application from the settlement information. For example, if the second application is a budget planner application, the device 1000 may extract information which relates to at least one of purchased goods, a settlement amount, a purchase date, a purchase time, and a seller from the settlement information. Also, for example, if the second application is a calendar application, the device 1000 may extract at least one of purchased goods information and reservation information from the settlement information. Also, if the second application is an SNS application, the device 1000 may extract at least one of purchased goods information, purchase date information, purchase time information, and reservation information from the settlement information.

The device 1000 may extract data of a type which is supported by the second application. For example, if the second application is a budget planner application, the device 1000 may extract image data and text data from the settlement information. Also, for example, if the second application is a calendar application, the device 1000 may extract image data and text data from the settlement information. Also, if the second application is an SNS application, the device 1000 may extract moving picture data, image data, text data, and voice data from the settlement information.

In operation S334, the device 1000 converts the extracted forwarding information to a format that may be executed by the second application. The device 1000 may convert the extracted forwarding information to a data format that is usable by the second application. In this case, the device 1000 may collect in advance information which relates to a data format supported by the second application. The device 1000 may collect in advance information which relates to the data format supported by the second application from the second application or the separate server. The information which relates to the data format that is usable by the second application may include, for example, codec information and/or a file extension name, but the present exemplary embodiment is not limited thereto.

The device 1000 may change the type of data. For example, the device 1000 may convert voice data to text data, or vice versa. In this case, various types of text-to-speech (TTS) technologies and speech-to-text (STT) technologies are usable for the conversion of data. For example, the device 1000 may capture part of moving picture data in order to convert the captured data to still image data, but the present exemplary embodiment is not limited thereto.

The device 1000 may provide forwarding information to the separate server and may receive forwarding information which has been converted by the separate server. The converted forwarding information has a format which is compatible with the second application. In this case, the device 1000 may provide the separate server with at least one of the forwarding information, an identification value of the second application, and information which relates to the data format that is usable by the second application, and may provide a request that the separate server convert the forwarding information. The separate server that converts the format of forwarding information may include, for example, any one or more of an SNS server, a settlement service providing server, a content providing server, and a shopping service providing server, but the present exemplary embodiment is not limited thereto.

In operation S336, the device 1000 provides the second application with the converted forwarding information. The second application may execute an operation of the second application by using the converted forwarding information as an input value.

FIG. 7 is a flowchart which illustrates a method for setting the first application, the forwarding information, and the second application, according to an exemplary embodiment.

In operation S700, the device 1000 sets the first application. The device 1000 may display, on the screen, a list of applications which relate to settlement, and may determine the first application based on a user selection input. For example, the device 1000 may display, on the screen, a list of applications which include information which relates to settlement details or a receipt file from among the applications installed on the device 1000. Also, a user interface which is usable for receiving the user selection input may be displayed on the screen of the device 1000 via a separate popup window. The user interface may include a list of applications which relate to settlement.

In operation S710, the device 1000 sets the second application which relates to the first application. The device 1000 may display, on the screen, a list of applications which relate to the first application, and may determine the second application based on a user selection input. The applications which relate to the first application may include, for example, an application which relates to settlement and an application which has been executed with the first application over a preset number of times. Also, the user interface which is usable for receiving a user selection input may be displayed on the screen of the device 1000 via a separate popup window. The user interface may include a list of applications which relate to the first application. The device 1000 may determine at least one application as the second application.

In operation S720, the device 1000 sets forwarding information. The device 1000 may set the type of forwarding information to be provided to the second application based on a received user input. The device 1000 may display, on the screen, a list of the forwarding information to be provided to the determined second application and may match forwarding information which is selected based on the user input with respect to the second application. For example, a list which includes one or more of the name of goods, the name of a service, a settlement date, a settlement time, seller information, service provider information, reservation information, position information, and path information may be displayed on the screen of the device 1000. When a user selects the name of goods and the reservation information, a selected list may be matched with a calendar application.

The device 1000 may determine forwarding information to be provided to the second application without a separate user input. In this case, the device 1000 may obtain information which relates to the type of forwarding information used by the second application from the second application, and may determine forwarding information to be provided to the second application based on the obtained information.

FIG. 8 illustrates a forwarding information table which shows the second application and the forwarding information and data type which corresponds to the second application, according to an exemplary embodiment. Referring to FIG. 8, the forwarding information table according to the present exemplary embodiment may include a first application field 80, a second application field 82, a forwarding information field 84, and a data type field 86.

An identification value of the first application may be recorded in the first application field 80. An identification value of the second application which corresponds to the first application may be recorded in the second application field 82. For example, while "Mobile wallet" may be recorded in the first application field 80, "Budget planner", "Calendar", and "SNS" may be recorded in the second application field 82.

Although the second application which corresponds to the first application may be determined based on the user input, the present exemplary embodiment is not limited thereto. The device 1000 may collect the usage history of applications, and may determine the second application that uses information which is similar to the information used by the first application based on the collected usage history. Although FIG. 8 illustrates that the second application corresponds to the first application, the present exemplary embodiment is not limited thereto. For example, the second application may be determined based on information generated by the device 1000 or received from the outside. In this case, the second application may be an application which uses the information generated by the device 1000 or received from the outside.

The forwarding information to be provided to the second application may be recorded in the forwarding information field 84. Information which is selected from the information which is included in settlement information may be recorded in the forwarding information field 84. For example, if the second application is a budget planner application, any one or more of purchased goods, a settlement amount, a purchase date, a purchase time, and seller information may be recorded in the forwarding information field 84. Thus, when the device 1000 receives settlement information from the POS terminal 2000 or the separate server, information which relates to at least one of purchased goods, a settlement amount, a purchase date, a purchase time, and seller information which relates to the received settlement information may be provided to the budget planner application.

The type of data used by the second application may be recorded in the data type field 86. Data type of at least one of moving picture, image, text, and voice may be recorded in the data type field 86. For example, if the second application is a budget planner application, image and text that are data types that are usable by the budget planner application may be recorded in the data type field 86. Also, codec information and a file extension name related to the second application may be recorded in the data type field 86.

Figure 9:
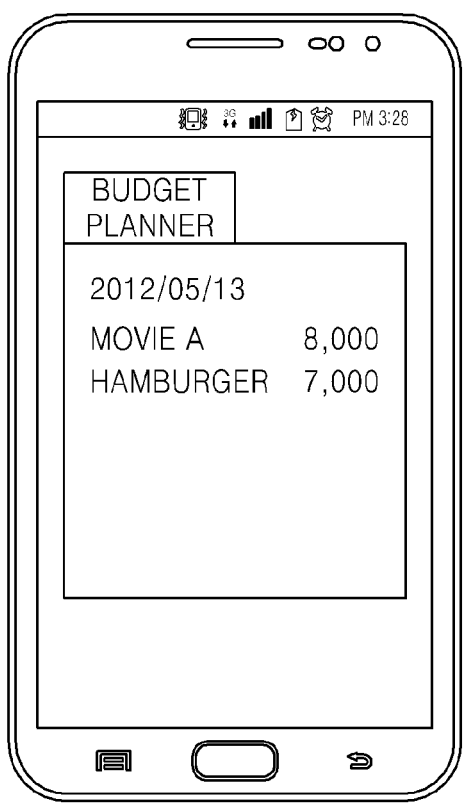
FIGS. 9, 10, and 11 illustrate examples of a display of forwarding information by the second application, according to an exemplary embodiment.
Figure 10:
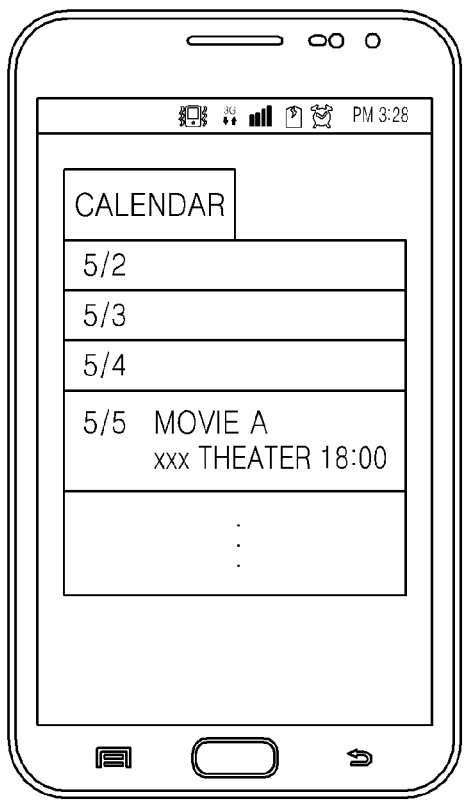
Figure 11:
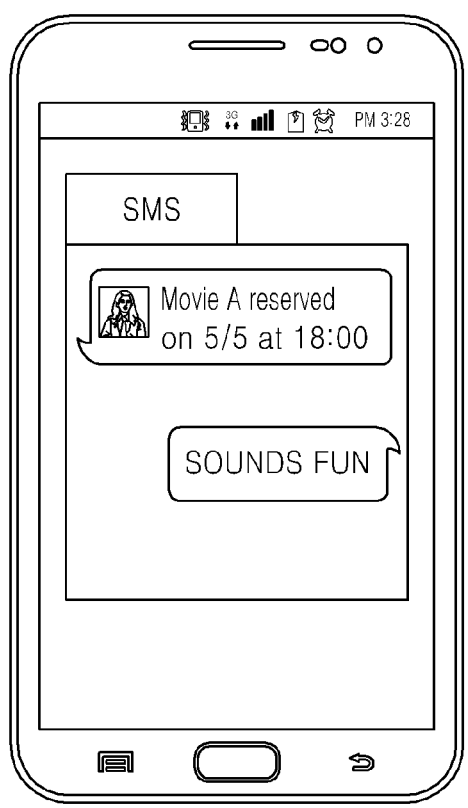

FIGS. 9, 10, and 11 illustrate examples of a display of forwarding information by the second application, according to an exemplary embodiment. Referring to FIG. 9, when the first application is executed and the device 1000 receives settlement information from the POS terminal 2000, the device 1000 may execute a budget planner application. Also, the device 1000 may provide the budget planner application with forwarding information, for example, the name of goods, settlement date, settlement amount, etc. The budget planner application may perform an operation of the budget planner application by using the received forwarding information, and may display the forwarding information on the screen of the device 1000. For example, "2012/05/13", "Movie A 8,000", and "Hamburger 7,000" may be displayed on an execution screen of the budget planner application.

Referring to FIG. 10, when the first application is executed and the device 1000 receives settlement information from the POS terminal 2000, the device 1000 may execute a calendar application. Also, the device 1000 may provide the calendar application with forwarding information, for example, the name of goods, reservation information, etc. The calendar application may perform an operation of the calendar application by using the received forwarding information, and may display the forwarding information on the screen of the device 1000. For example, "Movie A, xxx theater, 18:00" may be displayed on a field "5/5" of a weekly schedule.

Referring to FIG. 11, when the first application is executed and the device 1000 receives settlement information from the POS terminal 2000, the device 1000 may execute an SNS application. Also, the device 1000 may provide the SNS application with forwarding information, for example, the name of movie, a movie poster image, reservation information, etc. The SNS application may perform an operation of the SNS application by using the received forwarding information, and may display the forwarding information on the screen of the device 1000. For example, "Movie A reserved on 5/5 at 18:00" may be displayed on a chatting window of the SNS application.

Figure 12:
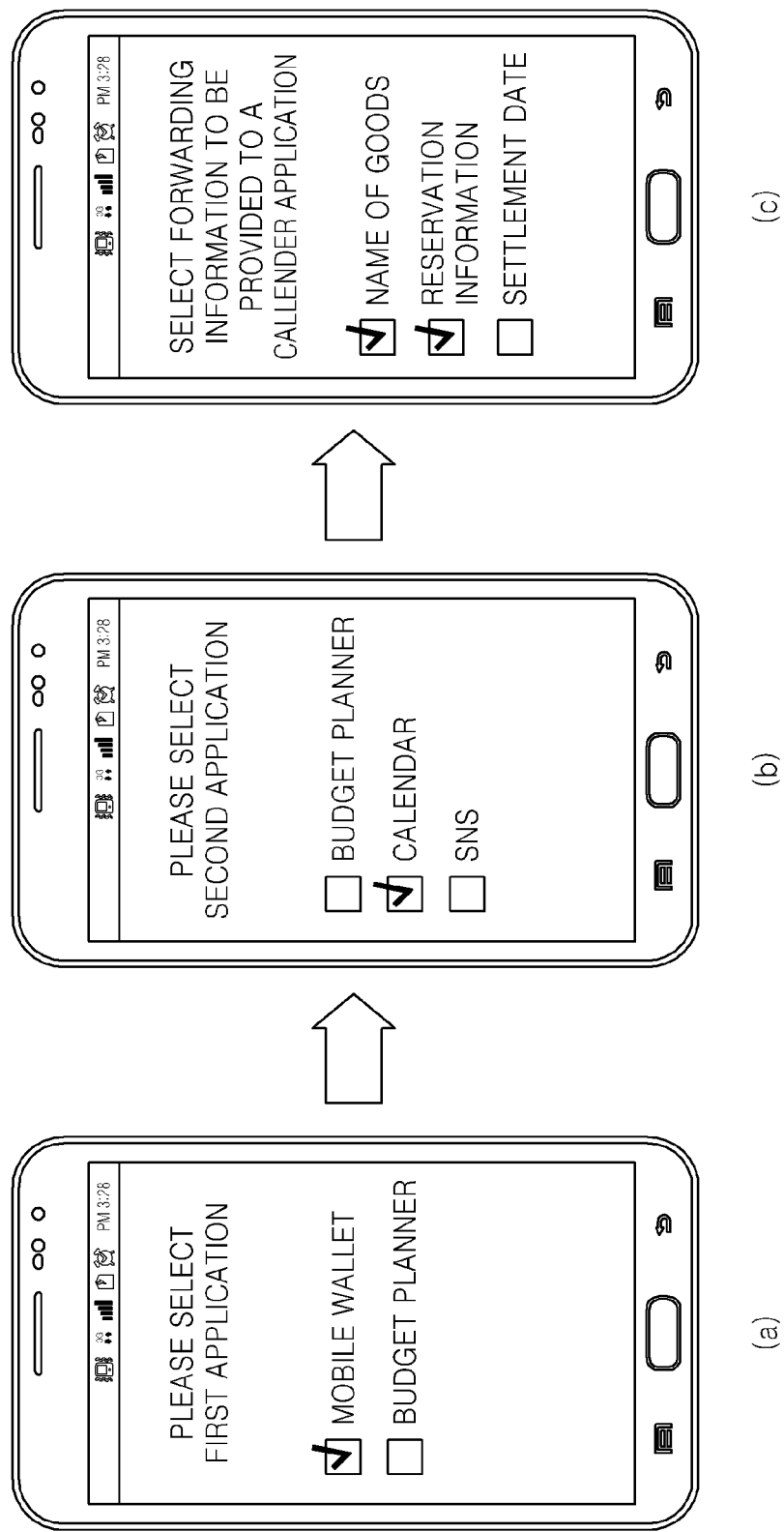
FIG. 12 illustrates an example of a user interface for setting the first application, the second application, and the forwarding information, according to an exemplary embodiment.

FIG. 12 illustrates an example of a user interface for setting the first application, the second application, and the forwarding information, according to an exemplary embodiment. Referring to drawing (a) on the left side of FIG. 12, a user interface for selecting the first application may be displayed on the screen of the device 1000, and the displayed user interface may include a list of applications from which the first application is selectable. Also, the applications which are included in the application list may be applications which relate to settlement. Although an application which is included in the application list may be an application which includes information which relates to settlement details of a receipt file from among the applications installed on the device 1000, the present exemplary embodiment is not limited thereto. A user may select a predetermined application from among the applications which are included in the application list, and the device 1000 may determine the selected application as the first application. For example, "Mobile wallet" and "Budget planner" may be displayed on the user interface in order to facilitate a selection of the first application. The user may select the "Mobile wallet" as the first application.

Referring to drawing (b) in the center portion of FIG. 12, a user interface to select the second application may be displayed on the screen of the device 1000. The displayed user interface may include a list from which the second application is selectable. The application list for selecting the second application may include at least one of an application which relates to the settlement information received from the POS terminal 2000 and an application which matches the first application, but the present exemplary embodiment is not limited thereto. Also, the user may select a predetermined application from among the applications which are included in the application list, and the device 1000 may determine the selected application as the second application. For example, "Budget planner", "Calendar", and "SNS" may be displayed on the user interface for selecting the second application, and the user may select the second application.

Referring to drawing (c) on the right side of FIG. 12, a user interface for selecting forwarding information may be displayed on the screen of the device 1000. The displayed user interface may include a data list for selecting forwarding information. The data list may include a list of data that may be used by the selected second application. For example, if a calendar application is selected as the second application, "Name of goods", "Reservation information", and "Settlement date" may be displayed on the user interface for selecting forwarding information. The user may select "Name of goods" and "Reservation information" as forwarding information to be provided to the calendar information.

Figure 13:
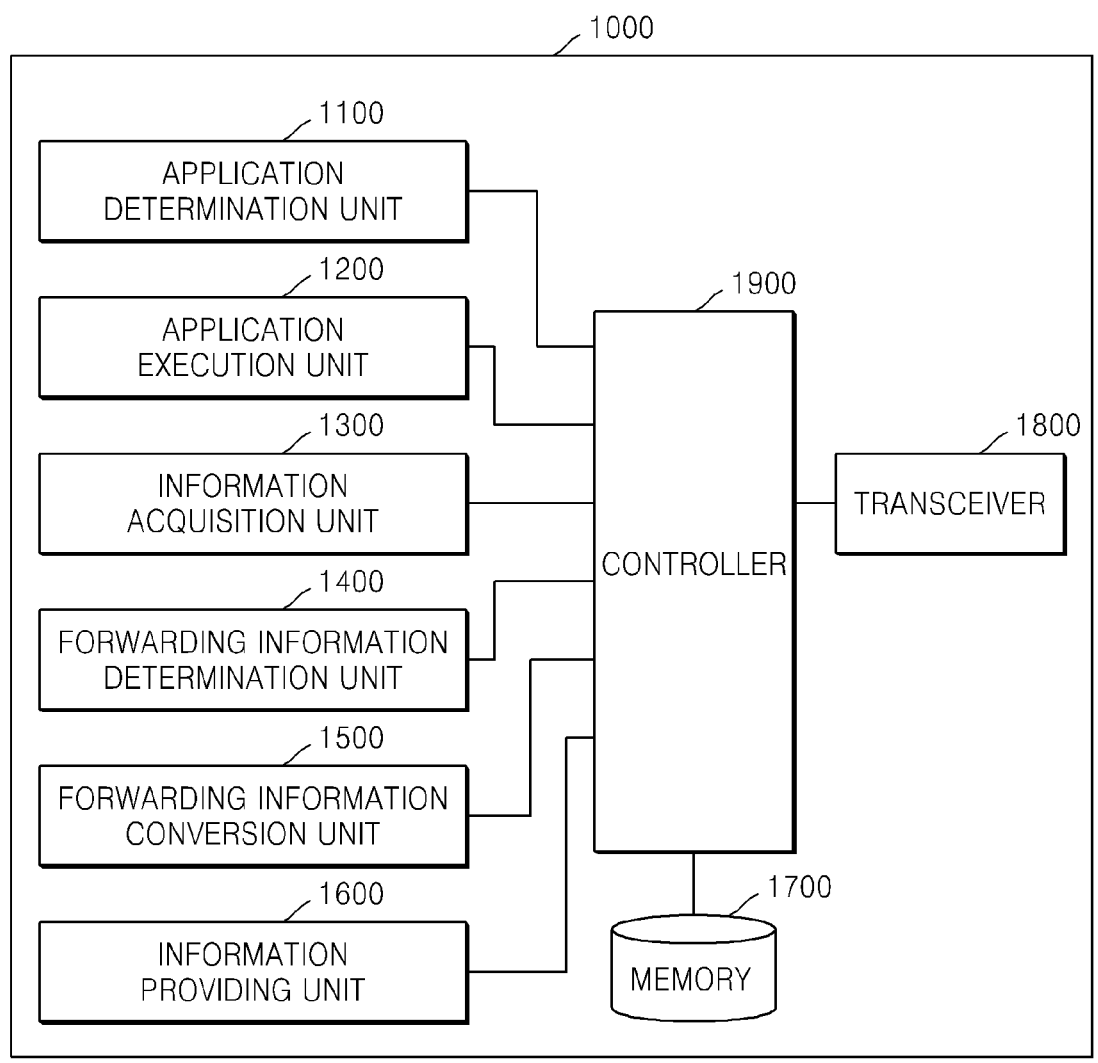
FIG. 13 is a block diagram which schematically illustrates the device of FIG. 1, according to an exemplary embodiment.

FIG. 13 is a block diagram which schematically illustrates the device 1000 of FIG. 1, according to an exemplary embodiment. Referring to FIG. 13, the device 1000 according to the present exemplary embodiment includes an application determination unit 1100, an application execution unit 1200, an information acquisition unit 1300, a forwarding information determination unit 1400, a forwarding information conversion unit 1500, an information providing unit 1600, a memory 1700, a transceiver 1800, and a controller 1900. Each of the application determination unit 1100, the application execution unit 1200, the information acquisition unit 1300, the forwarding information determination unit 1400, the forwarding information conversion unit 1500, and the information providing unit 1600 may be embodied as a hardware component, such as, for example, integrated circuitry or a device component which has a dedicated function, or as a software module which is programmed to execute a respective function. The transceiver 1800 is embodied as a hardware component which is capable of performing transmission and reception of electromagnetic signals. The controller 1900 is embodied as a hardware component, such as, for example, a microprocessor or dedicated circuitry.

The application determination unit 1100 determines the first application and the second application. The application determination unit 1100 may determine a predetermined application from among the applications which are installed on the device 1000 as the first application. For example, the application determination unit 1100 may select a predetermined application from among applications which relate to making settlements as the first application. Also, the application determination unit 1100 may display a list of applications which relate to making settlements on the screen and may select a predetermined application based on a user selection input.

The application determination unit 1100 may determine the applications which relate to settlement and may determine at least one of the determined applications as the second application. The application determination unit 1100 may display a list of the determined applications on the screen and may determine the second application based on the user selection input to the list of the determined applications. In this case, the application determination unit 1100 may recommend some of the determined applications based on the type of forwarding information which is included in settlement information, and may align the recommended applications. For example, if the settlement information includes purchase goods information, purchase date information, and settlement amount information, a budget planner application and/or an SNS application that use the purchase goods information, purchase date information, and settlement amount information may be recommended. Also, for example, if the settlement information includes reservation information, the device 1000 may recommend a calendar application. The application list may be displayed on the screen of the device 1000 via a separate popup-window.

The application execution unit 1200 executes the first application and the second application. The application execution unit 1200 may execute the first application, whereas the information acquisition unit 1300 that is described below may receive settlement information from the POS terminal 2000 or the separate server. However, the present exemplary embodiment is not limited thereto, and the application execution unit 1200 may execute the first application after receiving the settlement information. Also, the application execution unit 1200 may execute the second application when the settlement information is received.

The information acquisition unit 1300 acquires information which relates to the first application. For example, if the first application is an application which relates to making settlements, the information acquisition unit 1300 may acquire settlement information which relates to settlement via the first application. As the device 1000 approaches the POS terminal 2000, the information acquisition unit 1300 may receive settlement information from the POS terminal 2000, but the present exemplary embodiment is not limited thereto. The information acquisition unit 1300 may receive settlement information from the separate server. The settlement information may include, for example, any one or more of the name of goods, the name of a service, a settlement date, a settlement time, seller information, service provider information, and reservation information.

The forwarding information determination unit 1400 may determine forwarding information to be provided to the second application. The forwarding information determination unit 1400 may set the type of forwarding information to be provided to the second application based on a user input. The forwarding information determination unit 1400 may display, on the screen, a list of pieces of forwarding information to be provided to the second application and may match selected forwarding information with the second application based on the user input. For example, a list including the name of goods, the name of a service, a settlement date, a settlement time, seller information, service provider information, reservation information, position information, and path information may be displayed on the screen of the device 1000. When the user selects the name of goods and reservation information, the selected information may be matched with a calendar application.

Also, the forwarding information determination unit 1400 may determine forwarding information to be provided to the second application without a separate user input. In this case, the forwarding information determination unit 1400 may acquire, from the second application, information which relates to the type of forwarding information used by the second application, and may determine forwarding information to be provided to the second application based on the acquired information.

The forwarding information conversion unit 1500 converts forwarding information to be provided to the second application in a format that is executable by the second application. The forwarding information conversion unit 1500 may convert the extracted forwarding information to a data format that may be used by the second application. In this case, the forwarding information conversion unit 1500 may collect, in advance, information which relates to the format of data that the second application supports. In this case, the forwarding information conversion unit 1500 may collect, in advance, information which relates to the format of data that the second application supports from the second application or the separate server. Also, the information which relates to the format of data that may be used by the second application may include, for example, codec information or a file extension name, but the present exemplary embodiment is not limited thereto.

Also, the forwarding information conversion unit 1500 may change the type of data. For example, the device 1000 may convert voice data to text data or vice versa. In this case, various types of TTS technologies and STT technologies are usable for the conversion of data. For example, the device 1000 may capture part of moving picture data in order to convert the captured data to still image data, but the present exemplary embodiment is not limited thereto.

Also, the forwarding information conversion unit 1500 may provide forwarding information to the separate server and may receive forwarding information for which the format is converted by the separate server. In this case, the forwarding information conversion unit 1500 may provide the separate server with forwarding information, an identification value of the second application, and information which relates to the data format that may be used by the second application, and may request that the separate server convert the forwarding information. The separate server which performs a conversion of the format of forwarding information may include, for example, any one or more of an SNS server, a settlement service providing server, a content providing server, and a shopping service providing server, but the present exemplary embodiment is not limited thereto.

The information providing unit 1600 provides forwarding information to the second application. The information providing unit 1600 may provide the converted forwarding information to the second application.

The memory 1700 stores various pieces of information which may be used for executing the first application and the second application on the device 1000 and for providing a part of or the whole of the settlement information which is received from the POS terminal 2000 to the second application.

The transceiver 1800 transmits and/or receives, with the POS terminal 2000 or the separate server, the various pieces of information which may be used for executing the first application and the second application on the device 1000 and for providing a part of or the whole of the settlement information which is received from the POS terminal 2000 to the second application.

The controller 1900 controls each of the application determination unit 1100, the application execution unit 1200, the information acquisition unit 1300, the forwarding information determination unit 1400, the forwarding information conversion unit 1500, the information providing unit 1600, the memory 1700, and the transceiver 1800, so as to control the overall operation of the device 1000, to execute the first application and the second application by the device 1000, and to provide a part of or the whole of the settlement information which is received from the POS terminal 2000 to the second application.

An exemplary embodiment may be embodied in the form of a non-transitory or transitory recording medium which includes computer executable command languages, such as a program module executed by a computer. A computer-readable storage medium may be a useable medium that may be accessed by a computer and may include any or all of volatile and non-volatile media and/or a separable and inseparable media. Further, the computer-readable storage medium may include any or all of a computer storage medium and a communication medium. The computer-readable storage medium may include any or all of volatile and non-volatile media or a separable and inseparable media embodied by a particular method or technology for storing information such as computer-readable command languages, data structures, program modules, and/or other data. The communication medium may typically include any one or more of computer-readable command languages, data structures, program modules, and/or other data which relates to a modulated data signal such as carrier waves, or other transmission mechanism, and may also include a particular information forwarding medium.

While the present inventive concept has been particularly shown and described with reference to exemplary embodiments thereof, it will be understood by those skilled in the art that various changes in form and details may be made therein without departing from the spirit and scope of the present inventive concept as defined by the appended claims. For example, each constituent element that is described to be a single type may be worked by being distributed, or constituent elements that are described to be distributed may be worked in the form of being incorporated.

What is claimed is:

1. A method for providing settlement information by using a device which provides the settlement information to an application which is installed on the device, the method comprising:

executing a first application which is installed on the device, wherein the first application is determined based on a user selection from among a first list of applications that is displayed on the device;

displaying a second list of applications on the device as a result of the user selection;

receiving the settlement information from an external device via the executed first application, wherein the first application is a transaction application which executes a transaction with the external device;

converting at least a part of the received settlement information in order to facilitate a use of the received settlement information by a second application which is installed on the device, wherein the second application is determined based on a user selection from among the second list of applications that is displayed on the device;

providing the converted at least the part of the received settlement information to the second application;

providing a user interface for selecting forwarding information which is used by the selected second application; and determining the second application which relates to the received settlement information, wherein the providing the converted at least the part of the received settlement information to the second application comprises providing forwarding information which corresponds to the determined second application to the second application, and wherein the forwarding information which corresponds to the second application includes information which is selected from the received settlement information.

2. The method of claim 1, wherein the converting at least the part of the received settlement information comprises extracting forwarding information to be provided to the second application from the at least the part of the received settlement information and converting a format of the extracted forwarding information.

3. The method of claim 2, wherein the converting at least the part of the received settlement information further comprises using a server to convert the format of the extracted forwarding information, and the providing the converted at least the part of the received settlement information to the second application comprises providing the extracted forwarding information to the server and using the server to provide the extracted forwarding information for which the format has been converted by the server to the second application.

4. The method of claim 1, wherein, when the settlement information is received, a user interface which is usable for determining the second application is provided, and the forwarding information which corresponds to the second application is output.

5. The method of claim 4, wherein the user interface comprises a popup window.

6. The method of claim 1, wherein the first application comprises an application which relates to making a settlement, and the second application comprises at least one of a calendar application, a budget planner application, and a social network service (SNS) application.

7. A device for providing settlement information to an application which is installed on the device, comprising:

a controller which is configured to execute a first application which is installed on the device, wherein the first application is determined based on a user selection from among a first list of applications that is displayed on the device, and wherein the controller is further configured to display a second list of applications on the device as a result of the user selection; and a transceiver which is configured to receive settlement information from an external device by the executed first application, wherein the first application is a transaction application which executes a transaction with the external device;

wherein the controller is configured to convert at least a part of the received settlement information in order to facilitate a use of the received settlement information by a second application which is installed on the device, and provide the converted at least the part of the received settlement information to the second application, and provide a user interface for selecting forwarding information which is used by the selected second application, wherein the second application is determined based on a user selection from among the second list of applications that is displayed on the device, wherein the controller is further configured to determine the second application which relates to the received settlement information, and provide forwarding information which corresponds to the determined second application to the second application, and wherein the forwarding information which corresponds to the second application includes information which is selected from the received settlement information.

8. The device of claim 7, wherein the controller is further configured to extract forwarding information to be provided to the second application from the received settlement information and to cause a conversion of a format of the extracted forwarding information.

9. The device of claim 8, wherein the controller is further configured to provide the extracted forwarding information to a server and to receive, from the server, the forwarding information for which the format has been converted by the server.

10. The device of claim 7, wherein, when the settlement information is received, a user interface which is usable for determining the second application is provided, and the forwarding information which corresponds to the second application is output.

11. The device of claim 10, wherein the user interface comprises a popup window.

12. The device of claim 7, wherein the first application comprises an application which relates to making a settlement, and the second application comprises at least one of a calendar application, a budget planner application, and a social network service (SNS) application.

13. A method for providing data by using a device which provides data to an application which is installed on the device, the method comprising:

executing a first application which is installed on the device, wherein the first application is determined based on a user selection from among a first list of applications that is displayed on the device;

displaying a second list of applications on the device as a result of the user selection;

receiving data from an external device via the executed first application, wherein the first application is a transaction application which executes a transaction with the external device;

converting at least a part of the received data in order to facilitate a use of the received data by a second application which is installed on the device, wherein the second application is determined based on a user selection from among the second list of applications that is displayed on the device;

providing the converted at least the part of the received data to the second application;

providing a user interface for selecting forwarding information which is used by the selected second application; and determining the second application which relates to the received data, wherein the providing the converted at least the part of the received data to the second application comprises providing forwarding information which corresponds to the determined second application to the second application, and wherein the forwarding information which corresponds to the second application includes information which is selected from the received data.

14. A non-transitory computer-readable recording medium having recorded thereon a program for executing the method defined in claim 1.

15. A non-transitory computer-readable recording medium having recorded thereon a program for executing the method defined in claim 13.

16. A method for using information for execution of an application, comprising:

using a device to execute a first application which is installed on the device, wherein the first application is determined based on a user selection from among a first list of applications that is displayed on the device;

displaying a second list of applications on the device as a result of the user selection;

receiving, by the device, information which relates to the execution of the first application, wherein the first application is a transaction application which executes a transaction with an external device;

converting at least a part of the received information in order to facilitate a use of the received information by a second application which is installed on the device, wherein the second application is determined based on a user selection from among the second list of applications that is displayed on the device;

providing the converted at least the part of the received information to the second application;

providing a user interface for selecting forwarding information which is used by the selected second application;

using the received information to determine the second application, wherein the second application is determined based on a user selection from among the second list of applications that is displayed on the device; and using the device to execute the determined second application, wherein the providing the converted at least the part of the received information to the second application comprises providing forwarding information which corresponds to the determined second application to the second application, and wherein the forwarding information which corresponds to the second application includes information which is selected from the received information.

17. The method of claim 16, wherein the using the received information to determine a second application comprises determining a type of the received information and selecting the second application from a plurality of candidate applications which are installed on the device based on the determined type.

18. The method of claim 16, wherein the using the received information to determine a second application comprises determining a format of the received information and selecting the second application from a plurality of candidate applications which are installed on the device based on the determined format.

19. The method of claim 16, wherein the using the received information to determine a second application comprises displaying at least a part of the received information on a screen of the device, receiving a user input which relates to the displaying of the at least the part of the received information, and selecting the second application from a plurality of candidate applications which are installed on the device based on the received user input.

* * * * *